April 20, 1965   L. J. STREET   3,179,233
SHEET SORTING MACHINES
Filed Jan. 3, 1963
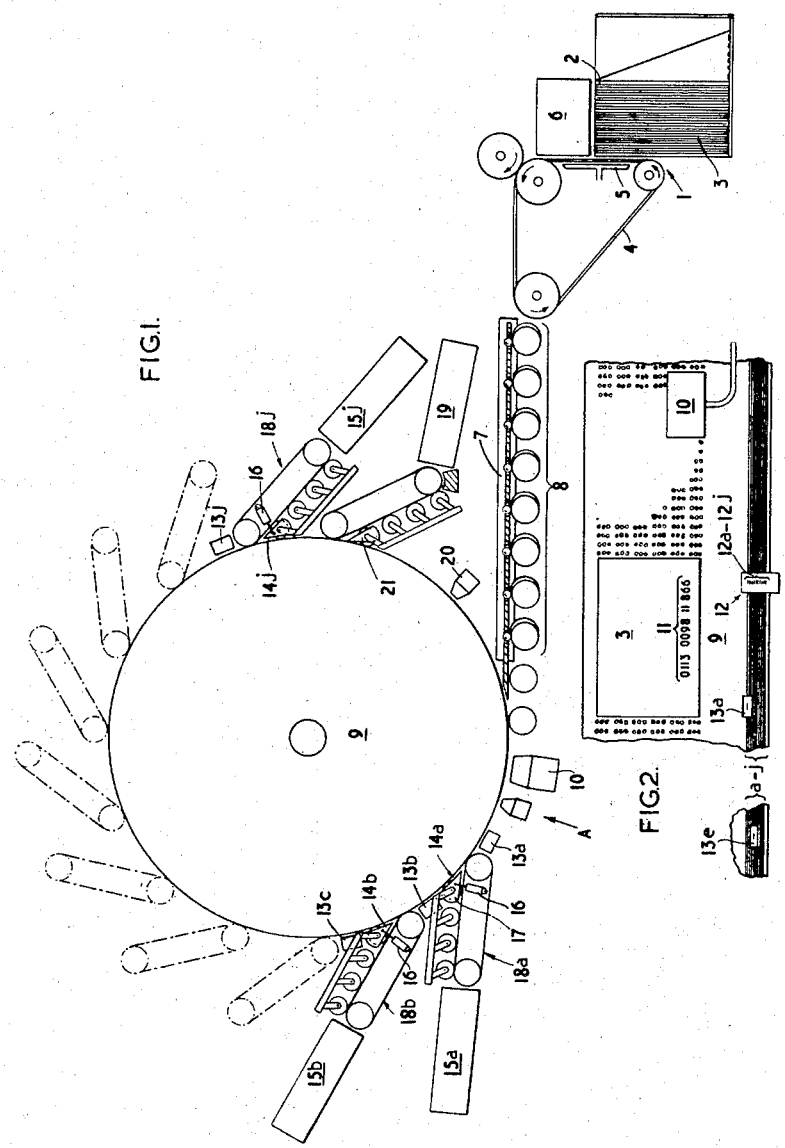
INVENTOR
LESLIE JOHN STREET
Norris & Bateman
ATTORNEYS

United States Patent Office 3,179,233
Patented Apr. 20, 1965

3,179,233
SHEET SORTING MACHINES
Leslie John Street, Long Ashton, near Bristol, England, assignor to Parnall & Sons Limited, Birmingham, England, a British company
Filed Jan. 3, 1963, Ser. No. 249,242
Claims priority, application Great Britain, Jan. 5, 1962, 462/62, Patent 962,276
8 Claims. (Cl. 198—38)

This invention relates to sheet sorting machines of the kind employed for sorting sheets such as for example bank cheques, football coupons, or punched cards, into receiving stations appropriate to coded information carried by the sheets.

In the particular type of sheet sorting machines with which this invention is concerned there is provided a single sheet feeder, conveyor means for transporting sheets received from said feeder in aligned sequence to a transport system, primary reading means for sensing coded information on the individual sheets, and diverter means under the control of said reading means for routing the individual sheets into receiving channels appropriate to the information on the individual sheets. The diverter mechanism for the several receiving channels may intercept the path of the sheets on the transport system at a common position or at several mutually spaced apart positions, but essentially the diverter mechanism is actuated to route a sheet after the sheet has been read and before arrival of the sheet at the diverter position. This operation of the diverter mechanism necessitates an information storing function which the hitherto been achieved either by accurately spacing the sheets in their travel on the transport system and actuating the diverter mechanism after a predetermined interval from the reading of each sheet, or by actuating the diverter mechanism to route a particular sheet after a predetermined number of preceding sheets counted photo-electrically or magnetically have passed between the reading head and the diverter mechanism. These modes of control of the diverter mechanism have proved to have shortcomings; for example the first mode of control imposes a maximum transport speed limitation whereas the second mode can lead to loss of correct sorting following failure to read any one sheet.

The present invention has for its object to avoid the aforesaid shortcomings in sorting machines of the aforesaid type by utilising a novel mode of storing information for control of the diverter mechanism from the reading means.

The invention consists of a sheet sorting machine of the aforesaid kind and type characterised by writing means under control of said reading means for imparting information onto a member forming part of or connected to the transport system whereby the information is conveyed in synchronism with the sheets, and secondary reading means responsive to said written information to control the operation of said diverter means. Thus the invention may be said to be essentially distinguished from the prior art in that the diverter means is actuated to appropriately route the various sheets in response to information travelling with the sheets rather than in direct response to information on the sheets.

Preferably said writing and second reading means comprise a plurality of pairs of writing and reading heads with each pair disposed on different tracks on said member.

One example of the practical realisation of the invention is described with reference to the accompanying drawings, wherein:

FIGURE 1 is a schematic side elevation of apparatus according to the invention; and
FIGURE 2 is a fragmentary view in the direction A of FIGURE 1.

In the illustrated embodiment of the invention there is provided a sheet delivering station 1 comprising a holder 2 for a stack of sheets 3, a belt conveyor 4 wherein ports in the belt coact with a vacuum shoe 5 to abstract sheets one at a time from the stack in known manner, and means 6, such as for example a counter-rotating vacuum capstan, for rejecting all but the first of any simultaneously fed sheets. The sequence of sheets are aligned against a reference edge 7 as they are carried over driven oblique rollers 8 before being fed onto a rotating perforate drum type transport system 9 internally connected to means for maintaining a partial vacuum within the drum, whereby the sequence of sheets are held in an aligned series on the periphery of the drum 9. The sheets 3 are traversed on the drum past a primary reading head 10 which senses coded information 11 on the sheets. The information 11 may be read photo-electrically or magnetically in known manner.

The information 11 sensed by the primary reading head, after interpretation by electronic circuitry, is transmitted to writing means 12 scanning the drum 9 and serving to impart to the drum 9, at positions in predetermined constant advance relationship to the leading edge of each sheet 3, coded information appropriate to each of the sheets. Conveniently the writing means 12 consists of one or more magnetising heads adapted to write the information in magnetic form on the drum.

A plurality of secondary reading heads 13a–13j scan the written information on the drum 9. These secondary reading heads 13a–13j are located just before and connected through electronic control circuitry to their respective diverter mechanisms 14a–14j so that the written information on the drum 9 is read, to effect actuation of the diverter mechanism which will route the sheet 3 to a receiving station 15a–15j appropriate to the information on that sheet, as the sheet approaches its appropriate diverter mechanism. The diverter mechanisms may for example consist of solenoid 16 actuated deflector arms 17 which when rocked by their solenoids are adapted to intercept the sheets 3 as they are conveyed on the drum 9 so as to guide the sheets via conveyors 18a–18j to their respective receptacles 15a–15j.

Preferably, to facilitate differentiation between the information appropriate to the various secondary reading heads, a plurality of stacked writing heads 12a–12j equal in number to the reading heads 13a–13j scan parallel annular tracks a–j on the drum. By this means the electronic circuitry is not called upon to sort the information as between the various heads, and should a sheet fail to be sensed it cannot upset the sensing of other sheets but will simply be permitted to pass to a reject station 19.

In order to remove all information imparted to the drum after one revolution the parallel tracks a–j are all scanned by an erase head 20 located between the reject station diverter 21 and the delivery end of the aligning conveyor rolls 8.

Whereas in the above description the information has been applied directly to the drum 9 it will be realised that instead the information can be written on a member carried by the drum, such as for example onto a magnetisable tape on the drum, or can be applied to any member rotated in synchronism with the drum. Further, the invention is not confined to a drum type transport system but can also be applied to endless belt or other type transport systems giving for example a rotary or rectilinear conveyance of the sheets wherein the information is imparted to some member forming part of or directly connected to the sheet conveying elements of the system so that the information is conveyed with said sheets.

I claim:
1. A sheet sorting machine comprising a single sheet feeder for dispensing one at a time sheets containing automatically readable information, a conveyor for receiving said sheets and transporting said sheets upon the surface of said conveyor in spaced relation along the length of said conveyor, primary reading means for sensing said information from the individual sheets on said conveyor, electromagnetic writing means operably connected to said primary reading means so as to be automatically operated thereby to impart magnetic information to said conveyor at points in predetermined spacial relation to the sheets from which the information was derived, secondary electromagnetic reading means for sensing said imparted information from said conveyor, and diverter means operably connected to said secondary reading means so as to be automatically operated thereby for diverting each said sheet from said conveyor to a destination appropriate to the information on that sheet.

2. The sheet sorting machine defined in claim 1, wherein said conveyor is a drum about the periphery of which said reading means, writing means and diverter means are distributed.

3. The sheet sorting machine defined in claim 2, wherein said drum has a perforate cylindrical wall and a source of vacuum is connected to the interior of said drum for holding sheets on said surface by suction.

4. The sheet sorting machine defined in claim 1, wherein said primary reading means is of the electromagnetic type.

5. The sheet sorting machine defined in claim 1, wherein said electromagnetic writing means comprising a plurality of electromagnetic writing units disposed and operative to impart information to any one of a plurality of parallel tracks on said conveyor, the selection of the track being dependent upon the classification of the information.

6. The sheet sorting machine defined in claim 5, said secondary electromagnetic reading means comprising a plurality of secondary electromagnetic reading units respectively scanning said plurality of tracks on said conveyor.

7. The sheet sorting machine defined in claim 6, said conveyor being a drum and said diverter means comprising a plurality of diverter units each connected to a respective one of said secondary electromagnetic reading units and disposed around the periphery of said drum.

8. The sheet sorting machine defined in claim 1, wherein means is provided for erasing magnetic information from said conveyor before said writing means.

References Cited by the Examiner
UNITED STATES PATENTS

| | | | |
|---|---|---|---|
| 2,784,851 | 3/57 | Bretschneider. | |
| 2,812,079 | 11/57 | Carnine et al. | 198—38 X |
| 2,905,466 | 9/59 | Azari et al. | |
| 2,936,556 | 5/60 | Gibson | 198—38 X |
| 3,040,323 | 6/62 | Brenner et al. | |
| 3,103,285 | 9/63 | Goodell et al. | 198—38 X |
| 3,140,767 | 7/64 | Hauer | 198—38 X |

FOREIGN PATENTS 761,566  11/56  Great Britain.

SAMUEL F. COLEMAN, *Primary Examiner.*

WILLIAM B. LA BORDE, *Examiner.*